US009111258B2

(12) United States Patent
Bell

(10) Patent No.: US 9,111,258 B2
(45) Date of Patent: Aug. 18, 2015

(54) CONNECTING TO MEETINGS WITH BARCODES OR OTHER WATERMARKS ON MEETING CONTENT

(71) Applicant: Microsoft Corporation, Redmond, WA (US)

(72) Inventor: Jeffrey Robert Charles Bell, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/659,917

(22) Filed: Oct. 25, 2012

(65) Prior Publication Data
US 2014/0117073 A1    May 1, 2014

(51) Int. Cl.
*G06F 17/00* (2006.01)
*G06Q 10/10* (2012.01)
*H04L 12/18* (2006.01)

(52) U.S. Cl.
CPC ............ *G06Q 10/101* (2013.01); *G06Q 10/109* (2013.01); *H04L 12/1818* (2013.01)

(58) Field of Classification Search
CPC .................... G06F 17/30879; G06F 17/30882; G06F 17/30002; G06F 17/30725
USPC ............... 235/375, 462.11; 707/621; 715/753
See application file for complete search history.

(56) References Cited

U.S. PATENT DOCUMENTS

| | | | | |
|---|---|---|---|---|
| 8,558,864 | B1 * | 10/2013 | Koller et al. | 348/14.01 |
| 2002/0152388 | A1 * | 10/2002 | Linnartz et al. | 713/176 |
| 2007/0019616 | A1 | 1/2007 | Rantapuska et al. | |
| 2007/0143399 | A1 | 6/2007 | Qi | |
| 2009/0013045 | A1 | 1/2009 | Maes et al. | |
| 2009/0018903 | A1 | 1/2009 | Iyer | |
| 2009/0179983 | A1 | 7/2009 | Schindler | |
| 2010/0061538 | A1 | 3/2010 | Coleman et al. | |
| 2010/0235446 | A1 | 9/2010 | Hehmeyer et al. | |
| 2010/0259547 | A1 * | 10/2010 | de Aguiar et al. | 345/474 |
| 2010/0259549 | A1 | 10/2010 | Brown et al. | |
| 2011/0167357 | A1 | 7/2011 | Benjamin et al. | |
| 2012/0079399 | A1 * | 3/2012 | Ferman et al. | 715/753 |

(Continued)

OTHER PUBLICATIONS

"Office Live Meeting", Retrieved at <<http://www.techdata-cloud.com/fl/microsoft-office-live-meeting/>>, Retrieved Date: Aug. 7, 2012, pp. 4.

(Continued)

*Primary Examiner* — Allyson Trail
(74) *Attorney, Agent, or Firm* — Steve Crocker; Danielle Johnston-Holmes; Micky Minhas

(57) ABSTRACT

Methods and Systems for connecting to online meetings are provided. In order to connect to an online meeting, coordinates for the meeting can be discoverable by an image or audio watermark overlaid onto content being shared by the online meeting. A person attending a physical meeting in which at least one attendee device or meeting facilitation device is connected to an online meeting can discover the coordinates for the online meeting by capturing and decoding an image or audio watermark overlaid on the content of the online meeting. The image or audio watermark may include a barcode superimposed on a content screen that can be captured and decoded by the person's computing device. A meetings application client on the computing device can be used to navigate to the coordinates discovered by the person's computing device to enable the person to join the meeting.

10 Claims, 9 Drawing Sheets

(56) References Cited

U.S. PATENT DOCUMENTS

| | | | |
|---|---|---|---|
| 2012/0239618 A1* | 9/2012 | Kung | 707/621 |
| 2013/0064524 A1* | 3/2013 | Griffin et al. | 386/262 |
| 2013/0091290 A1* | 4/2013 | Hirokawa et al. | 709/227 |
| 2013/0111362 A1* | 5/2013 | Alexandrov et al. | 715/753 |
| 2013/0292473 A1* | 11/2013 | Soderberg et al. | 235/462.06 |

OTHER PUBLICATIONS

"Enable instant access and cross-firewall collaboration from virtually any mobile device or desktop", Retrieved at http://www.adobe.com/products/adobeconnect/features.html>>, Retrieved Date: Aug. 7, 2012, pp. 9.

"WebEx Meetings", Retrieved at <<https://scienceadvice017.webexone.com/help/us/WebOfcHelp/html/webex_meeting.htm>>, Retrieved Date: Aug. 7, 2012, pp. 7.

"International Search Report & Written Opinion for PCT Patent Application No. PCT/US2013/065774", Mailed Date: Jan. 19, 2015, 10 pages.

* cited by examiner

CONNECTING TO MEETINGS WITH BARCODES OR OTHER WATERMARKS ON MEETING CONTENT

BACKGROUND

Currently, people join online meetings by means of meeting coordinates (such as a universal resource locator (URL) or a dial-in number) that are shared separately from the online meeting experience. To enable someone to join an online meeting, a meeting organizer shares meeting coordinates by, for example, issuing a meeting invitation providing the meeting coordinates, a meeting identifier, and a meeting password used by the invitee to be admitted to the meeting. To participate in the online meeting, a person opens a tool (like email) on their computing device to find the meeting coordinates (and other information) shared by the meeting organizer and then uses the information from the invitation to join the online meeting at the scheduled time.

If another person would like to join the online meeting, an invitation is sent to that person. In some cases, the meeting coordinates were never shared with some of the participants, either because of the way they were invited or because the meeting was set up ad hoc with no advance sharing of the online coordinates. An online meeting interface may have content which augments the experience even for people who are physically present at a meeting. It would be desirable to have a technique that allows a person to join an online meeting that is in progress without having to have a meeting invitation issued to them or having to spend time searching for the meeting invitation previously provided to them.

BRIEF SUMMARY

Techniques and systems for connecting to an online meeting are described herein. In accordance with embodiments of the invention, content being shared in an online meeting is provided with visual or audible watermarks overlaid and/or mixed in that contain the meeting's coordinates. The watermarks can include, but are not limited to, barcodes and audio watermarking that encode and contain the URL and/or other information for joining the meeting. The watermarks can be automatically generated and overlaid onto the content by a meetings or conferencing service.

According to one aspect, a person within sight or hearing of an online meeting may join the meeting without knowing the meeting coordinates by using their computing device to discover the coordinates overlaid on the meeting content.

According to one embodiment, a method is provided for joining the meeting that includes discovering the meeting coordinates by the image or audio watermark overlaid onto content being shared. The meeting coordinates can be discovered by a user's computing device by enabling the camera and/or microphone to begin sensing images and audio provided by the meeting and searching for the visual or audible watermarks. When the watermarks are encoded, such as when they are in the form of a barcode, then a decoding process may be performed to obtain the meeting coordinates.

The discovered coordinates can then be used to navigate to the meeting location and credentials can be presented to gain admittance to the meeting in an appropriate role, allowing a variety of rich interactions with the meeting including consuming meeting content directly on the device and controlling meeting content from that device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Techniques and systems for connecting to an online meeting are provided.

An online meeting or "meeting" refers to the virtual meeting space where people can connect, share, and communicate. "Web conference" or "web conferencing" is often used interchangeably with "online meeting" and refers to using the Internet to conduct and/or carry out an online meeting. Online meeting applications and web conferencing applications are software tools and services that facilitate the creation and control of a meeting, as well as provide various functions and features to participants of the meeting. For example, meeting and web conferencing applications may include features such as video conferencing, desktop viewing, content/input control, chat/instant messaging, calling/phone conferencing, and specific application sharing.

Examples of online meeting/web conferencing applications include MICROSOFT OFFICE LIVE MEETING and LYNC, trademarks or registered trademarks of Microsoft Corp.; WEBEX, a registered trademark of Cisco Systems, Inc. and/or one or more of its subsidiaries; and GOTOMEETING, a registered trademark of Citrix Systems, Inc. and/or one or more of its subsidiaries.

Meeting and conferencing applications may utilize client side components and server side components in order to facilitate the meeting. The combination of client side components and server side components can be part of a conferencing system in which one or more presenters and one or more attendees interact.

The distinction between a presenter and an attendee of a meeting may arise when it is desirable to distinguish who may have control of the meeting and its content. In some cases, it is desirable to limit the number of people who may edit a document or interact with content of a meeting while still enabling some functionality to others present for the online meeting. The web conferencing service may provide different consoles depending on how a person joining the meeting is assigned. In other cases, the distinction is merely to differentiate who is providing the content at a given time and the control may be shared and/or passed from one attendee to another.

Figure 1:
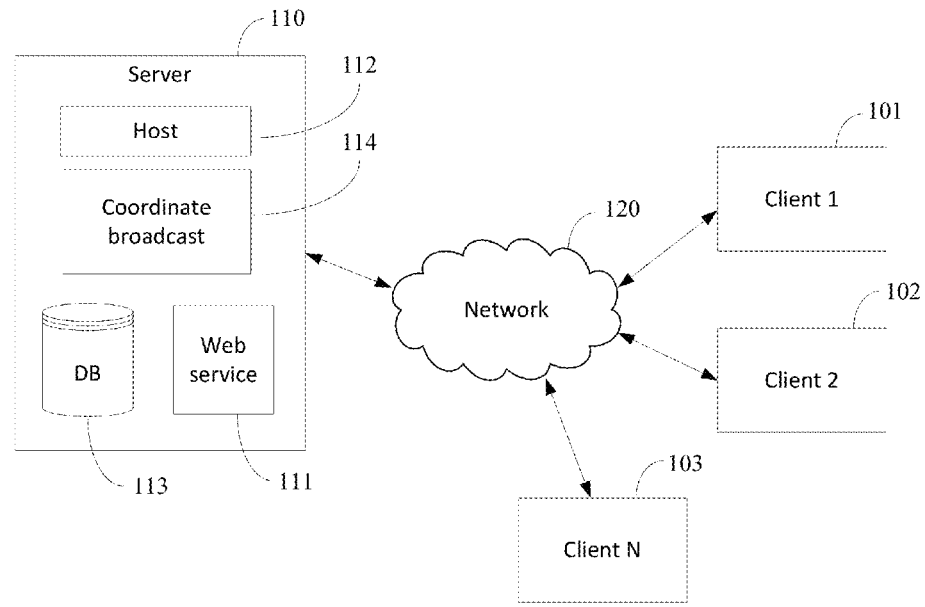
FIG. 1 is a block diagram illustrating an environment in which a conferencing system that provides meetings may operate.

FIG. 1 shows a block diagram illustrating an environment in which a conferencing system that provides meetings may operate. As depicted, the environment includes a first client device 101 that is either operated by the presenter or an attendee of the meeting; a second client device 102 of a person in the presence of the first client device 101 and who would like to join the online portion of the meeting; and a conferencing service server 110, each configured to communicate over a network 120.

The network 120 is a communications link that facilitates the transfer of electronic content between, for example, the attached computer systems of the client devices and the server. The network can be, but is not limited to, a cellular network, a point-to-point dial up connection, a satellite network, the Internet, a local area network (LAN), a wide area network (WAN), a WiFi network, or a combination thereof. Such networks are widely used to connect various types of network elements, such as routers, servers, and gateways. It should also be understood that the invention can be practiced in a multi-network environment having various connected public and/or private networks.

As will be appreciated by those skilled in the art, communication networks can take several different forms and can use several different communication protocols. Certain embodiments of the invention can be practiced in distributed-computing environments where tasks are performed by remote-processing devices that are linked through a communications network. In a distributed-computing environment, program modules can be located in both local and remote computer-readable storage media.

The computer systems of the first and second client devices 101, 102, and the conferencing service server 110 may include one or more central processing units (CPUs) and/or digital signal processors (DSPs), memory, mass storage (e.g., hard drive, solid state drive), I/O devices (e.g., network interface, user input devices), and a display (e.g., touch screen, flat panel, liquid crystal display, solid state display). Elements of the computer system can communicate with each other via a bus.

The computer systems of the first and second client devices 101, 102, and the conferencing service server 110 can be implemented as a desktop computer, a laptop computer, a tablet, a phone, a server, or any other machine capable of executing a set of instructions (sequential or otherwise) that specify actions to be taken by that machine, as well as multiple machines that individually or jointly execute a set (or multiple sets) of instructions to perform any one or more of the methods described herein. When a computer system reads and executes instructions that may be stored as code and/or data on a computer-readable medium, the computer system performs the methods and processes embodied as data structures and code stored within the computer-readable medium.

The first client device 101 may be any type of computer system that provides its user the ability to load and execute software programs and the ability to access a network, such as network 120, and communicate with the conferencing service server 110. Similarly, the second client device 102 may be any type of computer system that provides its user the ability to load and execute software programs and the ability to access a network, such as network 120, and communicate with the conferencing service server 110. In one embodiment, the first and second client devices 101, 102 are each executing a suitable operating system that supports the loading and executing of application programs, such as a web browser or other suitable user interface program, for interacting with and accessing the services provided on the conferencing service server 110.

One or both of the first client device 101 and the second client device 102 may be mobile computing devices such as a mobile phone, smart phone, a tablet computer, a laptop, and the like. In many embodiments, the first client device 101 is or includes a meeting facilitation device, which can include, but is not limited to, a projection screen, a digital whiteboard, a telephone (either traditional phone or one enabled through a computer), a computer (with monitor or other display), an interactive surface computing platform, or a combination thereof.

It should be understood that the operating environment is not limited to two client devices and other client devices 103 may communicate with the conferencing service server 110 over the network 120. These other client devices 103 may be operated by a presenter or an attendee of the meeting or by a person originally in the presence of a client device that is operated by the presenter or attendee of the meeting. Therefore descriptions of the first client device 101 and the second client device 102 are applicable to the other client devices 103.

The conferencing service server 110 can provide a conferencing service by "hosting" conferencing sessions (i.e., online meetings) and running an online meeting/web conferencing application. As depicted in FIG. 1, the conferencing service server 110 can include a web service component 111, a host component 112, and a conferencing database 113. In accordance with embodiments of the invention, the conferencing service server 110 also includes a coordinate broadcast component 114.

The coordinate broadcast component 114 overlays meeting content with machine understandable/detectable data providing the information needed to facilitate a client device joining a meeting. This machine understandable/detectable data may be similar to mobile tagging and can be used by a client device (such as the second client device 102) to join a meeting in progress when located in the presence of another client device already connected to the meeting. The coordinate broadcast component 114 may also include meeting coordinate encoding functions that can generate barcodes and/or watermarks from a database or on the fly. The barcodes may be one-dimensional, two-dimensional, or even three-dimensional barcodes (e.g., using time as a dimension such as an animated or video barcode)

The web service component 111 can handle the scheduling of meetings and authentication of users as generally performed in many web conferencing applications. In one embodiment, the web service component serves the meeting URL and provides a web form that requests information, such as a name, password and any other auxiliary information. When a user interested in joining the meeting uses a computing device, such as the second client device 102, to request to join the meeting and submits the information requested in the web form, the web service component 111 authenticates the user and delivers a response that directs the user's browser to the meeting page on the host component 112.

The host component 112 "hosts" the actual virtual meetings. The host component 112 processes the user's request for the meeting page (which was requested as a result of the web service component directing the user's browser to the meeting page as described above) by verifying that the user is authorized to enter the meeting and presenting the user with an appropriate meeting page. The host component 112 supports the meeting functions. Once the user is connected with the appropriate meeting page, the coordinate broadcast component 114 may broadcast the coordinates of the meeting via the user's computing device. For example, the user's device can broadcast the coordinates by rendering the data provided by the broadcast component onto the display of the user's device.

It should be understood that a user may control whether and how the broadcast feature is enabled. For example, when initially providing content to be shared via the online meeting, consent of the user and/or verification may be obtained with respect to enabling the meeting coordinates to be provided with the shared content. An organizer may also control which participants may receive the broadcast and/or whether meeting coordinates may be made available via the broadcast component.

The conferencing database 113 can be shared by the web service component 111, the host component 112, and the coordinate broadcast component 114, and functions as a repository for the data and information used by the components of the conferencing service server to facilitate the meeting. For example, the conferencing database 113 may represent and/or store information and data such as the properties of each meeting, the authentication records, the credentials of users authorized to enter each meeting, and the like.

The aforementioned aspects of the conferencing service server are only illustrative and are not intended to suggest any limitation as to the implementation of the illustrated components and/or the scope of use or functionality of the conferencing service server 110. For example, in various embodiments, the web service component 111, the host component 112, the conferencing database 113, and the coordinate broadcasting component 114 need not be implemented as part of the same computing system, but may be implemented in one or more different computing systems.

It should be understood that the operating environment illustrated in FIG. 1 is only one example of a suitable operating environment and is not intended to suggest any limitation as to the scope of use or functionality of the systems and methods for joining a meeting described herein. Moreover, one skilled in the art will appreciate that the ability to join an online meeting by being physically present in an area near provided meeting content can be readily adapted to other forms of virtual conferencing and collaboration.

In accordance with embodiments of the invention, by using the coordinates broadcast via the coordinate broadcast component 114 of the conferencing services server 110, a person wanting to join a meeting in progress and who is within visual or audio range of an online meeting can launch a meeting client and use their computing device (such as the second client device 102) to discover the meeting coordinates. The discovery of meeting coordinates can cause a web browser to execute and go to the meeting URL address discovered during the discovery stage. The meeting URL address may be served by the web service component 111 of the conferencing service server 110.

When the person's computing device opens the meeting URL address, a form may be displayed on the person's computing device screen so that the person may request to join the meeting. The form may request the person's name and a password (and any other auxiliary information). In one embodiment, by launching the site through the discovered coordinates (as opposed to an address provided in a traditional invitation), the form may be pre-filled with a password or there may not be an entry in the form for a password. Instead, other security features may be used to authorize a participant requesting to join the meeting. In another embodiment, the discovery of the meeting coordinates generates a meeting invitation as generally provided in a traditional invitation. The generated meeting invitation may be an email or message. In certain embodiments, the available modes of entering an online meeting once the coordinates are discovered can be selected by, for example, a meeting organizer.

Figure 2:
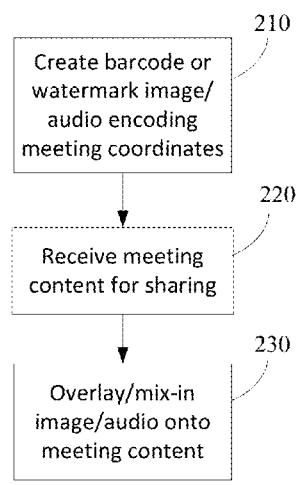
FIG. 2 is a flowchart illustrating a process for enabling in-person joining of a meeting for a user who does not have coordinates for the meeting in accordance with an embodiment of the present invention.

FIG. 2 is a flowchart illustrating a process for enabling in-person joining of a meeting for a user who does not have coordinates for the meeting in accordance with an embodiment of the present invention. The process illustrated in FIG. 2 may be carried out by a conferencing service or other meeting application.

Referring to FIG. 2, when an online meeting is created, the coordinates of the meeting can be encoded as a barcode or other watermark 210. The encoding may include at least one of an audio encoding and a video/image encoding. As content is uploaded for sharing to other participants of the meeting 220, the encoded coordinates can be overlaid or mixed into the meeting content 230. Thus, when the content is shared via a conferencing application mediating the meeting, the encoded coordinates (in the form of an image and/or audio) are broadcast (or rendered) along with the content.

The encoded coordinates in the form of an image or audio may be overlaid or mixed into the content in a variety of ways. For example, the encoded coordinates may be superimposed onto meeting content by inserting an image onto a region of the content being rendered such that the image appears to be part of the content being displayed. As another example, the encoded coordinates may be mixed into the meeting content by, for example, being an image inserted in video content by using the interstitial frame of a video stream.

In another embodiment, the coordinates may not be encoded. Rather, the coordinates may be presented on the content in the same form as would be provided in a meeting invitation (e.g., a URL or dial in number). This non-encoded meeting information may or may not be visible to a user but may be captured by the user's computing device and, via text recognition, facilitate the discovery of the meeting coordinates. When it is visible to the user, the user may directly enter the coordinates in a web browser on their device.

Figure 3:
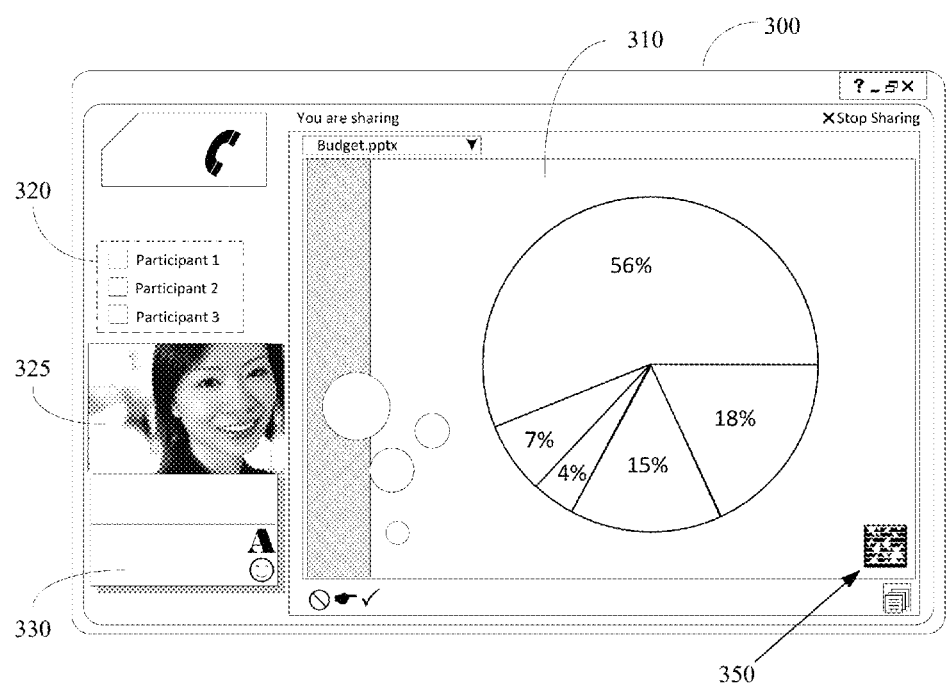
FIG. 3 is a simplified example graphical interface of a meeting application for sharing and accessing content in which various forms of a meeting join link of embodiments of the invention may be superimposed or overlaid.

FIG. 3 is a simplified example graphical interface of a meeting application for sharing and accessing content in which various forms of a meeting join link of embodiments of the invention may be overlaid or superimposed. Referring to FIG. 3, a meeting or web conferencing application interface 300 can be used to share content 310. In addition to displaying shared content 310, the meeting or web conferencing application may include various functions to interact with other participants 320 of the meeting. For example, video 325 and chat/instant messaging 330 may optionally be included as part of the interface 300.

When content is being shared via the interface 300, the meeting or web conferencing application can cause the encoded coordinates of the meeting (e.g., a barcode or watermark 350) to be available on the content 310 being displayed via the interface 300. Simultaneously or as an alternative, the web conferencing application may provide an audio signal encoding the meeting coordinates.

As one example where encoded coordinates (such as in the form of a visual tag) may be superimposed onto meeting content is when a screen or presentation slide (such as content 310 of FIG. 3) is being shared to participants of a meeting. FIGS. 4A-4D are slides having a various forms of a meeting join link superimposed or overlaid in accordance with certain embodiments of the invention.

Figure 4A:
FIGS. 4A-4D are example slides having a various forms of a meeting join link superimposed or overlaid in accordance with certain embodiments of the invention.

FIG. 4A shows a slide 410 on which a MICROSOFT Tag barcode 411 is superimposed. The Tag barcode 411, when captured by an image capture device (e.g., camera) of a mobile computing device, enables the mobile computing device to launch a link to data stored on a server. According to various embodiments of the invention, the Tag barcode provides coordinates of a meeting (for example, in the form of a URL). Tags may be black-and-white or color. In some embodiments, the Tag barcode may be visible on the slide and located at a border area of the slide so as to not interfere with the content. In some embodiments, the Tag barcode may be provided in a form that is not resolvable or visible to the human eye but capturable by a user's mobile computing device.

Figure 4B:

FIG. 4B shows a slide 420 on which a Quick Response code (QR-code) 421 is superimposed. A QR code is a matrix barcode easily recognized by the distinctive square blocks. Similarly to the Tag barcode 411, when the QR code 421 is captured by an image capture device (e.g., camera) of a mobile computing device, the image is decoded (for example by a tag reading software) in order to provide coordinates of a meeting, which can be launched by the mobile computing device. QR codes may be black-and-white or color. In some embodiments, the QR code may be visible on the slide and located at a border area of the slide so as to not interfere with the content. In some embodiments, the QR code may be provided in a form that is not resolvable or visible to the human eye but capturable by a user's mobile computing device.

Figure 4C:

FIG. 4C shows a slide 430 on which an image 431 is superimposed. The image 431 may be formed of dots (for example colored dots or a pixelated image) encoding the coordinates for the meeting such that a user's mobile computing device can capture the image, decode the image, and launch a link to the meeting. The image may incorporate a high capacity color barcode (HCCB).

Figure 4D:
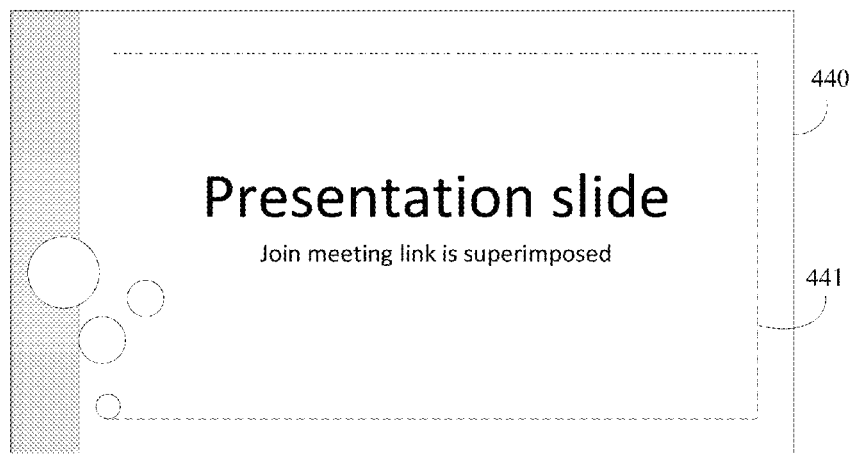

FIG. 4D shows a slide 440 having an "invisible" watermarking 441. The invisible watermarking 441 can be a watermark that is not resolvable or visible to the human eye, but capturable by a user's mobile computing device. For example, a barcode may flash on the screen, but do so too quickly to be seen by the naked eye. In another embodiment, data may be embedded in high-frequency components of the image. When the camera captures the watermarking 441, a high pass or band-pass filter may be applied to obtain the watermarking.

Figure 5:
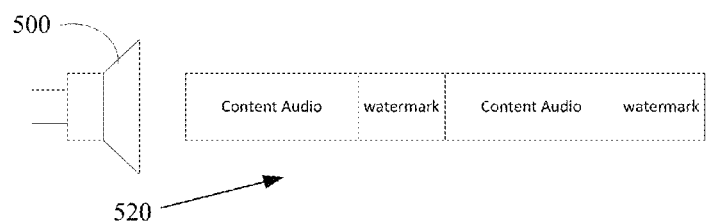
FIG. 5 is a diagram illustrating an audio form of a meeting join link mixed in or overlaid in accordance with an embodiment of the invention.

As yet another example of encoded coordinates, such as shown in FIG. 5, the encoded coordinates may be mixed into the audio stream such that an audio signal (that may not be audible to humans) is output either during times when no audio is being communicated or as part of the audio stream. FIG. 5 is a diagram illustrating an audio form of a meeting join link mixed in or overlaid in accordance with an embodiment of the invention. Referring to FIG. 5, a meeting or web conferencing service may overlay or mix in a signal over the audio for the meeting.

For example, audio from a conference may be output from a speaker 500 associated with a meeting facilitation device (or an attendee's client device). The audio may have an audio watermarking encoded with the audio stream 520 that can be detected by an audio capture device (e.g., a microphone) of a client computing device and deciphered/decoded by the client computing device to provide the coordinates of the meeting.

In another embodiment, the audio watermarking can be transmitted along with (and on top of) the audio stream at a frequency that is not audible to the human ear, for example in a similar fashion as a dog whistle. In accordance with various embodiments, the audio watermarking is overlaid on the audio stream and capable of being recognized by a user's computing device.

By presenting coordinates for the meeting as part of the content of the meeting, an in-room (or within hearing) attendee may pick up the coordinates from the content in order to join the meeting.

Figure 6:
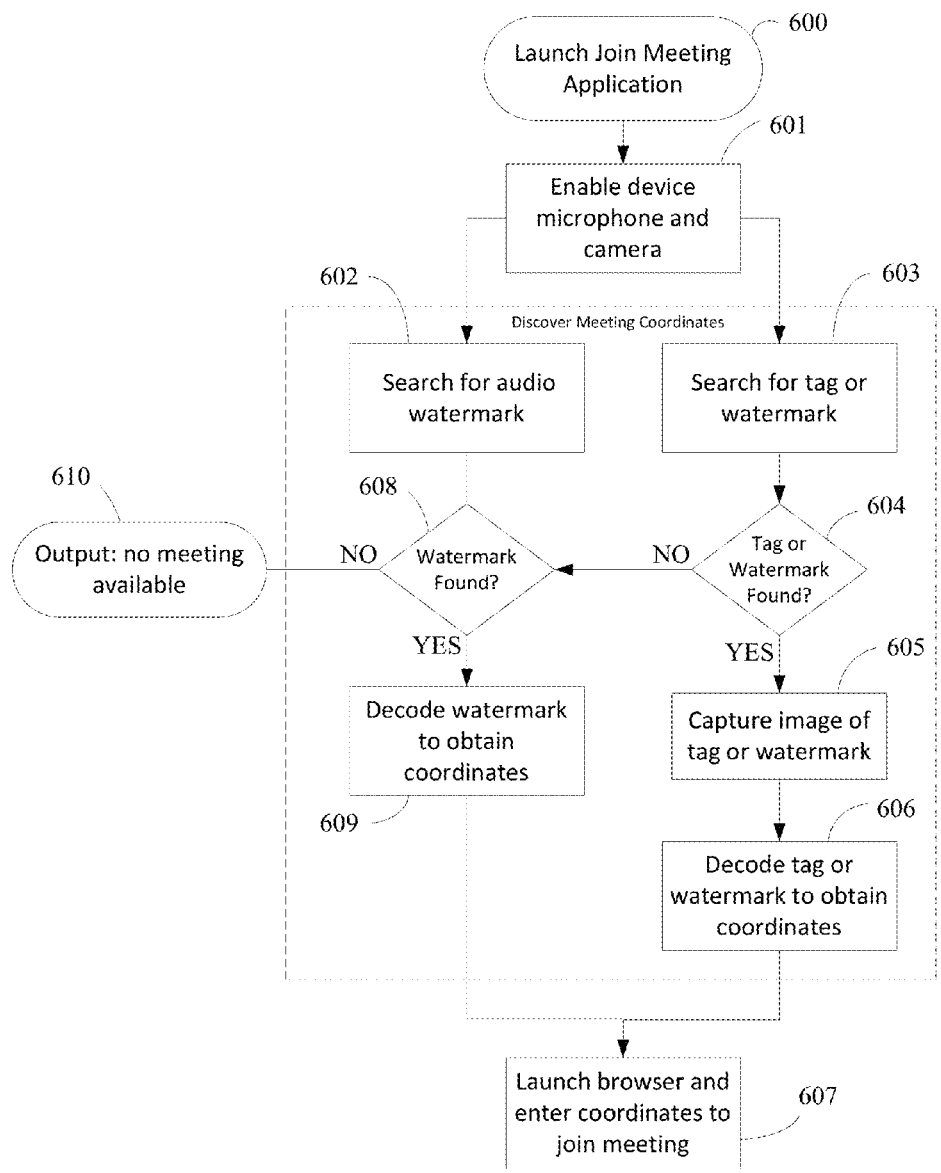
FIG. 6 is a flowchart illustrating a process for joining a meeting without having coordinates for the meeting in accordance with an embodiment of the present invention.

FIG. 6 is a flowchart illustrating a process for joining a meeting without having coordinates for the meeting in accordance with an embodiment of the present invention. Referring to FIG. 6, when a user is in the physical presence of a meeting being hosted by the conferencing service (or other application that may communicate with a conferencing services server) but is not connected to the meeting with their computing device (because they did not have the coordinates, no coordinates were provided before the meeting, or it may be more convenient to use the Join function than to find the coordinates previously provided to the user), the user can launch a join meeting application (600) on their computing device.

The join meeting application may be a stand-alone application or may be associated with a web conferencing application and can use the computing device to discover the meeting coordinates from audio or images provided by the meeting in progress.

When the join meeting application is launched, the application can enable or turn on the computing device's microphone and camera (601). The microphone is used to sense audio signals to search for an audio watermark (602) and the camera is used to sense images (light/dark/color) to search for a barcode/tag or watermark (603).

The user may point the camera at a display on which content form a meeting is being presented and, in (603), the application searches the data stream from the camera for an indication whether a barcode/tag/watermark is present (604). If a barcode/tag or watermark is determined to be present, then the image is captured (605) and the barcode/tag/watermark is decoded (or deciphered) to obtain the meeting coordinates (606). The application can then request to join the meeting using the discovered meeting coordinates by, for example, launching a browser and entering the coordinates to join the meeting (607). Additional authentication from the decoded barcode/tag or watermark may be provided from the join meeting application to the conferencing service in accordance with certain embodiments of the invention.

If the camera does not find a tag or watermark or if there is only audio at the user's location, then a determination can be made as to whether an audio watermark is in the audio data stream (608). The user's device microphone can be in a listening/watching mode waiting to detect the coordinates from the audio content. If a watermark is determined to be present in the audio stream, then the watermark is decoded (or deciphered) to obtain the meeting coordinates (609) and the discovered coordinates used to join the meeting (607). If an audio watermark is also not found, then the application can output a message that no meeting is available (610).

In certain cases, the searching for join information by the user's device may take place over a period of time. For example, the camera may be operated for a period of time to wait for a tag or watermark to appear. In certain embodiments where the join information is presented interstitially between frames, the tag or watermark may only appear once every second or every few seconds. The searching for the tag or watermark can be performed for a length of time that makes it possible to detect the interstitially located tag or watermark. In further embodiments, if at one point in time, no tag or watermark is detected, the application can retry automatically or prompt the user to manually retry.

In some embodiments the visual and audio search may be performed simultaneously and if both searches return coordinates, the coordinates may be compared to determine that the two coordinates match or one of the two coordinates may take precedence over the other according to a predetermined rule set. In addition, in some embodiments where the search is performed sequentially, the audio portion may be conducted before the visual portion or the visual portion may be conducted before the audio portion.

Figure 7:
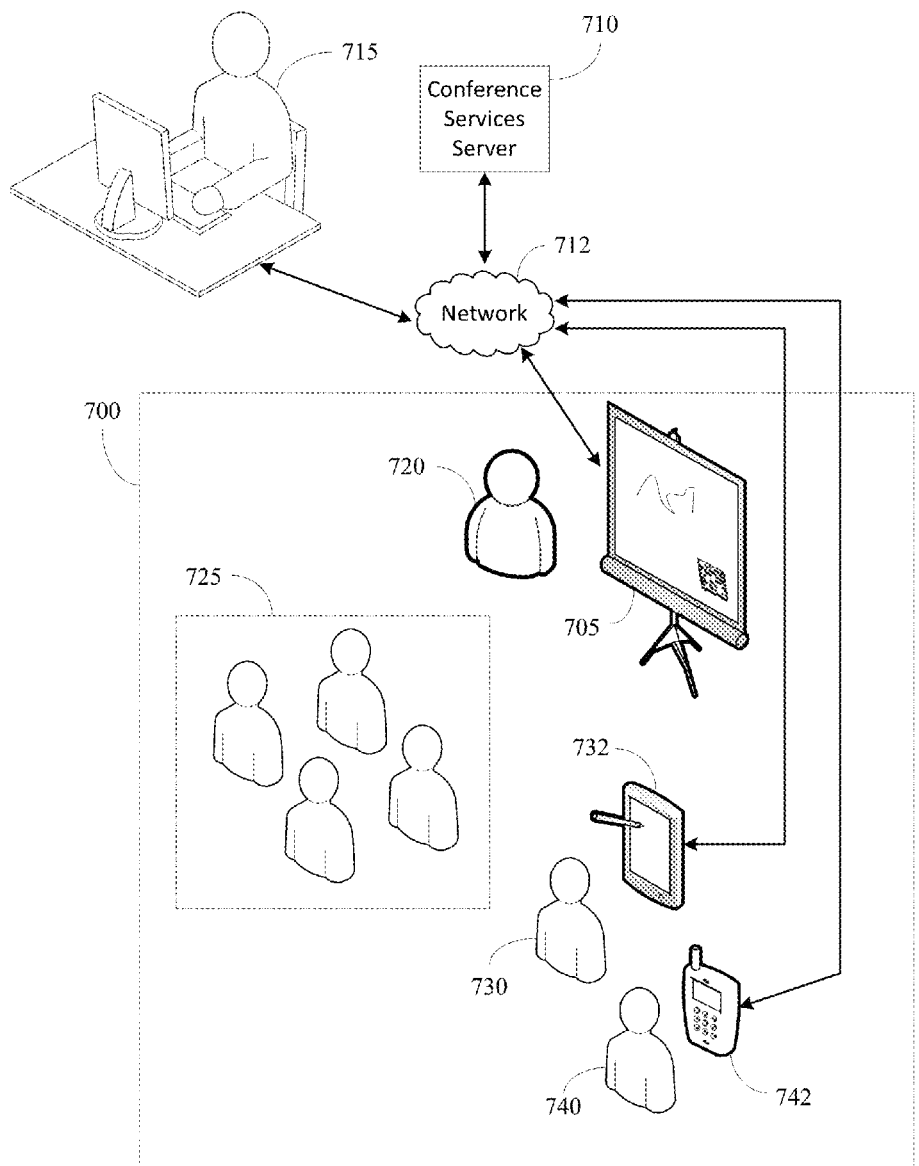
FIG. 7 is a diagram illustrating an environment in which various embodiments of the invention may be practiced.

FIG. 7 illustrates an environment in which various embodiments of the invention may be practiced. Referring to FIG. 7, at least some meeting participants are physically together, such as in a physical meeting room 700. A meeting of those at least some participants may be carried out in the meeting room 700 where content is shared using a meeting facilitation device 705. The meeting facilitation device 705 can include, but is not limited to, a projection screen, a digital whiteboard, a telephone (either traditional phone or one enabled through a computer), a computer (with monitor or other display), an interactive surface computing platform, or a combination thereof.

The meeting facilitation device 705 can be used to connect to a conference services server 710 over a network 712.

Scenarios that may occur in which embodiments of the invention can be practiced to enable enhanced interaction via web conferencing services include a scenario in which some participants know the meeting coordinates and have connected to the meeting and a scenario in which these coordinates are transparent to all users (such as in the case of an ad-hoc meeting).

In the case where some participants know the coordinates, a presenter may present content for sharing in the online meeting and the participants who were provided the coordinates (for example, via an invitation transmitted to them by a meeting organizer prior to the meeting) can connect to the online meeting to view/hear the content. Some of the participants may be located remotely from each other. For example, participants of the meeting can include a person 715 located remotely from the physical meeting room 700 (and who may even be the initial presenter and/or organizer for the meeting).

A person can also attend the meeting in a room in which the meeting is being conducted. Typically only one person in the room need know the meeting coordinates to connect the room to the meeting. For example, user 720 in the physical meeting room may have been provided the coordinates of a meeting organized by the person 715 located remotely and joined the meeting using a meeting facilitation device 705. Other participants 725 may not have been provided the coordinates, but are able to participate through the connection to the meeting provided to the user 720. However, without coordinates to the meeting, all other participants 725 that do not have the coordinates but are present are missing out on the opportunity to participate in the online portion of the meeting. These online portions of the meeting may include, but are not limited to, instant messaging/chat, sharing their presence and video, downloading or capturing links to presented content, and taking advantage of their personal device to consume and direct meeting content, as well as any other functionality provided by the conference service application.

Because the in-room video and/or audio is being mediated by a meetings application via the conference services server 710, that application has the ability to overlay or mix into the content a machine-readable set of coordinates for the meeting based on the settings for the online meeting.

In accordance with embodiments of the invention, if a user in the room wants to join the online portion of the meeting, the user may launch their meetings client application (e.g., a join meeting application such as described with respect to FIG. 6) on their mobile computing device. For example, a first user 730 can use their tablet 732 to launch a meetings client application and a second user 740 can use their phone 742 (e.g., a smart phone) to launch a meetings client application. The device (e.g., tablet 732, phone 742) uses its microphone to listen for an acoustic watermark in the meeting audio while the device camera may be pointed at the screen to pick up a visual watermark. If either of these detects meeting coordinates, the application will then navigate the user to the join experience for this particular meeting.

Figure 8:
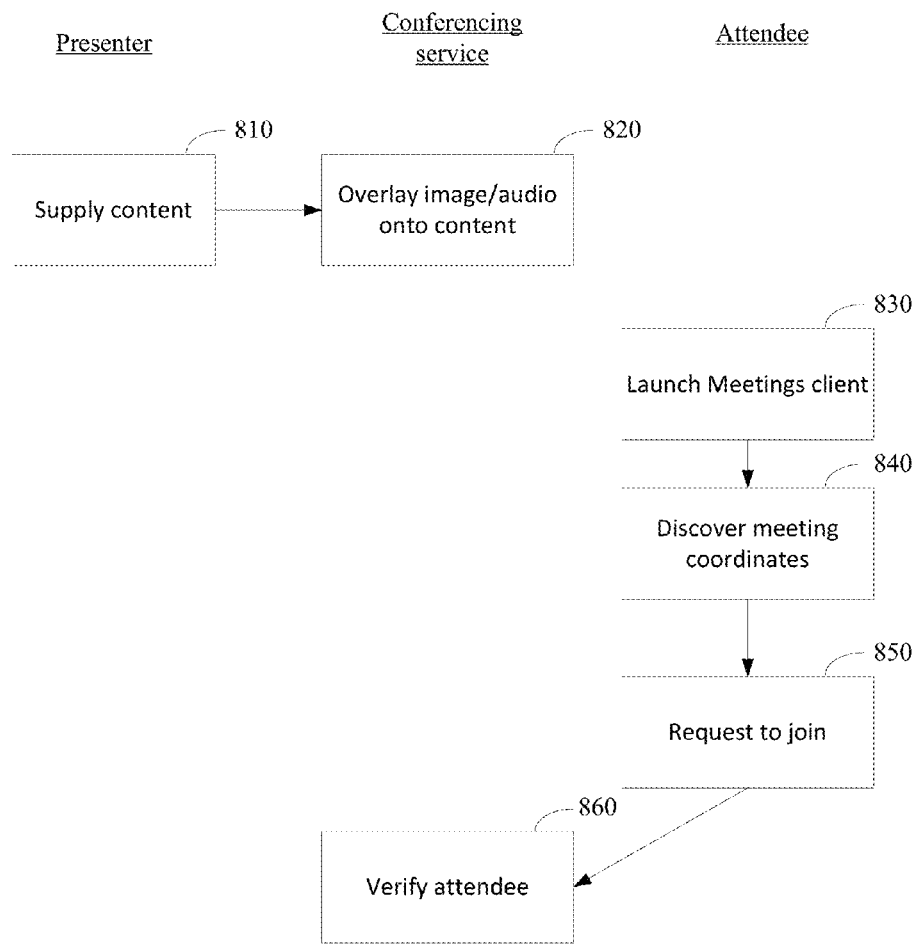
FIG. 8 is a flow diagram illustrating the processing carried out by a conferencing services server according to an embodiment of the present invention.

FIG. 8 is a flow diagram illustrating the processing carried out by a conferencing services server according to an embodiment of the present invention. Referring to FIG. 8, where the overlaying of meeting coordinates feature is enabled, when the presenter supplies content for the meeting 810, the conferencing service overlays image or audio onto the content 820. The image or audio is an encoded form of the coordinates of the meeting created by the conferencing service. The image or audio may be a barcode or other audio or visual watermark. An attendee of the meeting can launch a meetings client application 830 from their computing device and begin searching for the encoded coordinates using the camera and microphone capabilities of the device. Once the meeting coordinates are discovered 840, the coordinates are decoded (or deciphered) from their form presented by the conferencing service and the attendee can request to join the meeting 850.

At this point, the join experience may proceed as it does in cases where the meeting coordinates were shared in a traditional fashion, such as in email. For example, the conferencing service can receive the request to join from the attendee and verify that the attendee has the appropriate credentials to join 860.

If the conferencing service verifies that the person is authorized to attend the meeting as an attendee, the conferencing service can assign an identifier to the person (for example as an in-person attendee), launch a console (meeting interface) on the person's computing device screen, and add the person to a list of people currently in the meeting.

Security may also be a concern with respect to who may attend and how many attendees can be supported by the online meeting. Therefore, many approaches exist to ensure that only those invited to a meeting can connect to the meeting and access the content. Accordingly, certain embodiments of the invention can provide some additional control over who receives the content because a user (with computing device) must be physically present to see the image overlaid on the content of the meeting. This can be used to limit the "invitees" to the meeting to those in attendance in person.

In addition, connecting to a meeting in accordance with embodiments of the invention may be used as an in-person check-in. For example, where meetings are being held in multiple physical locations, the attendees at each physical location may join using a different encoded authentication with the coordinates of the meeting so that the meeting may know not only who is present, but also their locations. In addition, the encoded authentication and/or coordinates may change over time (for example at predetermined intervals during the course of a meeting), which may deter the sharing of coordinates to those not actually present.

The join experience may be further augmented by the knowledge that the user had to be physically present to receive the in-room credentials. For example, because possessing the credentials shared only in the meeting suggests physical presence in the meeting it may be possible to automatically join the meeting (without manually entering further credentials requiring manual admission to the meeting) when the coordinates are obtained using the in-person joining process.

In the case where the coordinates are transparent to all users, such as an ad hoc meeting scenario, a group of people may have gathered to meet and are using a computer to project content or are using a digital whiteboard to facilitate their discussion. For example, the user 720, other participants 725, first user 730, and second user 740 may decide to gather in the physical meeting room 700 and use meeting facilitating device 705 to facilitate their discussion. Since these participants are all local and the meeting may not have been scheduled in advance, it is possible that no online meeting coordinates were generated or shared ahead of time.

Furthermore, it is possible that the people in the meeting do not originally appreciate that an online meeting service (and its associated functionality) would be beneficial to support the meeting. In certain embodiments, an application presenting the content may be meetings-aware such that meeting coordinates can be generated and shown.

For example, a presentation software, such as MICROSOFT POWERPOINT, a registered trademark of Microsoft Corp., may be used to show presentation slides to the group in the meeting. In one embodiment, the presentation software connects to a meeting service for coordinates (either upon launch or upon request of a user) and overlays the meeting coordinates onto the slides being presented. A user connecting to the meeting service with these coordinates would cause the presentation session to escalate into an online meeting with richer capabilities.

Similarly, an application controlling a digital whiteboard could escalate to an online meeting by connecting to a conferencing services server (or other host) for coordinates, which are then provided overlaid on the whiteboard content in accordance with embodiments of the invention. A digital whiteboard may look like a traditional whiteboard in that users may write on the board (with dry erase markers or specialized styluses) but also includes a system that enables images to be displayed on the whiteboard and have the writing on the board stored for later review (and possible edit). A whiteboard application can be used to facilitate the digital part of the system.

In some embodiments, access to persisted whiteboard content (e.g., the content stored for later review and possible edit) can be controlled by presenting coordinates for the stored content on the whiteboard's display (in the form of a barcode/watermark). In one such embodiment, when a user connects via their mobile computing device to the whiteboard's "meeting" using the barcode/watermark overlaid on the whiteboard's content, the user may become an authenticated participant in the discussion: recorded as having been present and potentially granted rights to the persisted whiteboard. In this manner, a user can connect to a whiteboard using a similar process as connecting to an online meeting and will be able to record the whiteboard and have access to richer forms of the whiteboard (as compared to simply taking a snapshot of the whiteboard with a camera), structured data or recognized content, and the evolution of the whiteboard over time.

The embodiments and functionalities described herein may operate via a multitude of computing systems such as the server 110, and the client devices 101, 102, 103 described above with reference to FIG. 1, including wired and wireless computing systems, mobile computing systems (e.g., mobile telephones, tablet or slate type computers, laptop computers, etc.). In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet.

In addition, user interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

FIGS. 9A, 9B, 10, and 11 and the associated descriptions provide a discussion of a variety of systems in which embodiments of the invention may be practiced. It should be understood that the devices and systems illustrated and discussed with respect to these figures are for purposes of example and illustration and are not limiting of a vast number of computing device configurations that may be utilized for practicing embodiments of the invention, described herein.

Figure 9A:
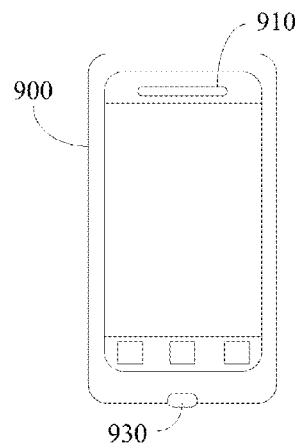
FIGS. 9A and 9B are a simplified front-side and back-side view, respectively, of a mobile computing with which embodiments of the present invention may be practiced.
Figure 9B:
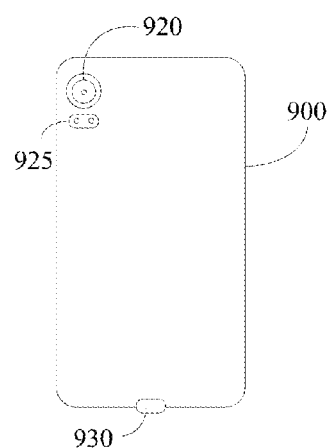

FIGS. 9A and 9B show a simplified front-side and back-side view of a mobile computing device with which embodiments of the present invention may be practiced. According to one implementation, the mobile computing device 900 can be a smart phone with a speaker 910, camera 920, LED flash 925, and microphone 930. When in discovery mode, the camera 920 and microphone 930 can be operated.

Figure 10:
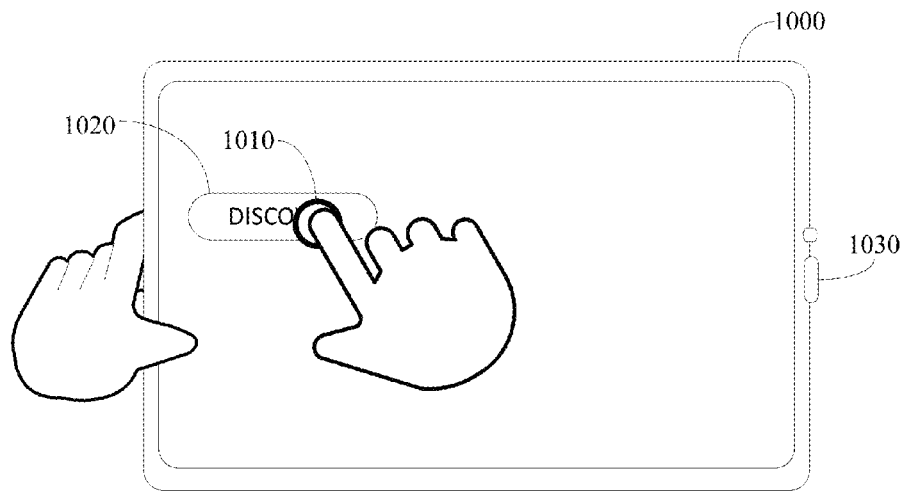
FIG. 10 is a simplified diagram of a mobile computing device with which embodiments of the present invention may be practiced.

FIG. 10 shows a simplified diagram of a mobile computing device with which embodiments of the present invention may be practiced. According to one implementation, the mobile computing device 1000 can be a tablet with a touch screen on which a user can tap 1010 an input selection such as a request to discover meeting coordinates. For example, by selecting "discover" 1020 within a meeting application on the mobile computing device 1000, the device's camera (not shown) can begin scanning for a barcode or watermark and the device's microphone 1030 can begin detecting for an audio watermark.

Figure 11:
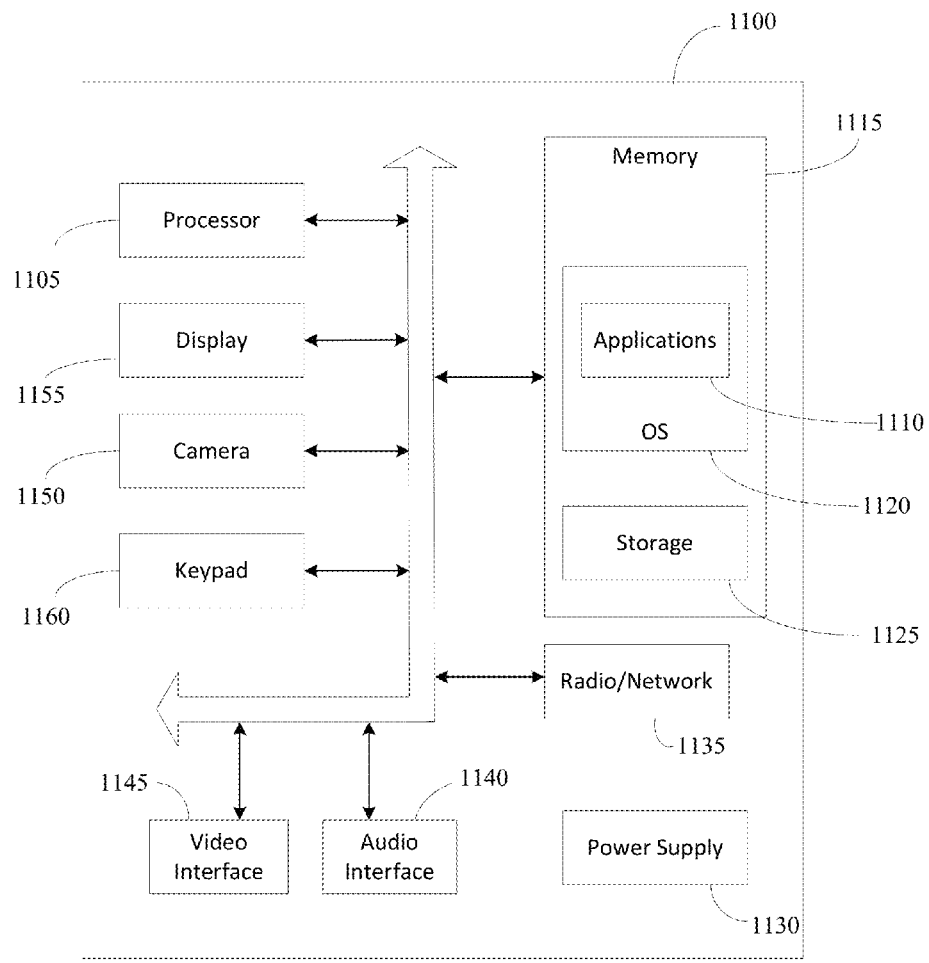
FIG. 11 is a block diagram illustrating components of a mobile computing device with which embodiments of the invention may be practiced.

FIG. 11 is a block diagram illustrating components of a mobile computing device used in some embodiments, such as the computing devices shown in FIGS. 9A and 9B or FIG. 10. That is, the mobile computing devices 900, 1000 shown in FIGS. 9A-9B and 10 can incorporate system 1100 to implement some embodiments. For example, system 1100 can be used in implementing a tablet (e.g., 1000) or smart phone (e.g., 900) that can run one or more applications similar to those of a desktop or notebook computer such as, for example, browser, e-mail, scheduling, instant messaging, and media player applications. In some embodiments, system 1100 is an integrated computing device, such as an integrated personal digital assistant (PDA) and wireless phone.

System 1100 includes a processor 1105 that processes data according to instructions of one or more application programs 1110 and/or operating system 1120. The one or more application programs 1110 may be loaded into memory 1115 and run on or in association with the operating system 1120. Examples of application programs include phone dialer programs, web conferencing programs, e-mail programs, personal information management (PIM) programs, word processing programs, spreadsheet programs, Internet browser programs, messaging programs, game programs, and the like. Other applications may be loaded into memory 1115 and run on the device, including various client and server applications.

System 1100 also includes non-volatile storage 1125 within memory 1115. Non-volatile storage 1125 may be used to store persistent information that should not be lost if system 1100 is powered down. Applications programs 1110 may use and store information in non-volatile storage 1125, such as e-mail or other messages used by an e-mail application, and the like. A synchronization application may also be included and reside as part of the application programs 1110 for interacting with a corresponding synchronization application on a host computer system (such as a server) to keep the information stored in non-volatile storage 1125 synchronized with corresponding information stored at the host computer system.

System 1100 has a power supply 1130, which may be implemented as one or more batteries and/or an energy harvester (ambient-radiation, photovoltaic, piezoelectric thermoelectric electrostatic, and the like). Power supply 1130 might further include an external power source, such as an AC adapter or a powered docking cradle that supplements or recharges the batteries.

System 1100 may also include a radio/network interface 1135 that performs the function of transmitting and receiving radio frequency communications. The radio/network interface 1135 facilitates wireless connectivity between system 1100 and the "outside world," via a communications carrier or service provider. Transmissions to and from the radio/network interface 1135 are conducted under control of the operating system 1120. In other words, communications received by the radio/network interface 1135 may be disseminated to application programs 1110 via operating system 1120, and vice versa.

The radio/network interface 1135 allows system 1100 to communicate with other computing devices, such as over a network.

An audio interface 1140 can be used to provide audible signals to and receive audible signals from the user. For example, the audio interface 1140 can be coupled to speaker (e.g., 910 of FIG. 9A) to provide audible output and a microphone (e.g., 930 of FIG. 9B, 1030 of FIG. 10) to receive audible input, such as to facilitate a telephone conversation. In accordance with embodiments of the present invention, the microphone may also serve as an audio sensor in order to facilitate the implementation of various embodiments of the invention. System 1100 may further include video interface 1145 that enables an operation of on-board camera 1150 to record still images, video stream, and the like, as well as to serve as an image sensor in order to facilitate the implementation of various embodiments of the invention. Visual output can be provided via a touch screen display 1155. In some cases, the display may not be touch screen and a user input elements, such as buttons, keys, roller wheel, and the like are used to select items displayed as part of a graphical user interface on the display 1155. A keypad 1160 can also be included for user input. The keypad 1160 may be a physical keypad or a soft keypad generated on the touch screen display 1155.

It should be understood the any mobile computing device implementing system 1100 may have additional features or functionality and is not limited to the configurations described herein.

In various implementations, data/information generated or captured by the device (e.g., 900, 1000) and stored via the system 1100 may be stored locally on the device, as described above, or the data may be stored on any number of storage media that may be accessed by the device via the radio/network interface 1135 or via a wired connection between the device and a separate computing device associated with the device, for example, a server computer in a distributed computing network, such as the Internet. As should be appreciated such data/information may be accessed via the device via the radio/network interface 1135 or via a distributed computing network. Similarly, such data/information may be readily transferred between computing devices for storage and use according to well-known data/information transfer and storage means, including electronic mail and collaborative data/information sharing systems.

Certain techniques set forth herein may be described in the general context of computer-executable instructions, such as program modules, executed by one or more computing devices. Generally, program modules include routines, programs, objects, components, and data structures that perform particular tasks or implement particular abstract data types. Certain methods and processes described herein can be embodied as code and/or data, which may be stored on one or more computer-readable media. Computer-readable media can be any available computer-readable storage media or communication media that can be accessed by the computer system. Certain embodiments of the invention contemplate the use of a machine in the form of a computer system within which a set of instructions, when executed, can cause the system to perform any one or more of the methodologies discussed above.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media It should be appreciated by those skilled in the art that computer-readable storage media include removable and non-removable structures/devices that can be used for storage of information, such as computer-readable instructions, data structures, program modules, and other data used by a computing system/environment. A computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. Computer storage media should not be construed or interpreted to include any carrier waves or propagating signals.

Furthermore, in addition to being implemented as software, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method for facilitating connecting to an online meeting, the method comprising:
    discovering, via a first device, meeting coordinates of an online meeting presented by a second device by an image overlaid onto a presentation screen or slide of content being shared by the online meeting, wherein the image further comprises authentication information, wherein the authentication information changes at predetermined intervals; and
    automatically joining the meeting, via the first device, using the meeting coordinates and the authentication information.

2. The method of claim 1, wherein the image comprises:
    a barcode encoding information including the meeting coordinates of the online meeting.

3. The method of claim 2, wherein discovering the meeting coordinates of the online meeting by the image overlaid onto the presentation screen or slide of content being shared by the online meeting comprises:
    enabling a camera of the first device;
    capturing the barcode from a display comprising content of the online meeting; and
    decoding the captured barcode to obtain the meeting coordinates.

4. The method of claim 1, further comprising launching, via the first device, a web browser and navigating to the discovered meeting coordinates to join the online meeting.

5. A method for facilitating joining a first device to an online meeting, the method comprising:
    overlaying, via a second device, an image onto a meeting presentation screen or slide of content being shared by an online meeting, the image encoding information including meeting coordinates of the online meeting for access by the first device; and
    providing a unique image for overlaying onto content being shared by the online meeting for each device connected to an online meeting server hosting the online meeting.

6. The method of claim 5, wherein overlaying the image onto the content of the presentation screen or slide comprises:
    rendering the image on a display on which the presentation screen or slide is rendered so that the image overlays the presentation screen or slide.

7. The method of claim 5, further comprising:
    receiving a request from a user device to join the online meeting using the meeting coordinates; and
    authenticating the user device.

8. A method for facilitating joining a first device to an online meeting, the method comprising:
    overlaying, via a second device, an image onto a meeting presentation screen or slide of content being shared by an online meeting, the image encoding information including meeting coordinates of the online meeting for access by the first device;
    generating the image to encode the meeting coordinates and authentication information;
    changing the authentication information at predetermined intervals; and
    generating a new image for each interval and overlaying the new image onto the content being shared by the online meeting.

9. The method of claim 8, further comprising:
    receiving a request from a user device to join the online meeting using the meeting coordinates; and
    authenticating the user device.

10. The method of claim 8, wherein overlaying the image onto the content of the presentation screen or slide comprises:
    rendering the image on a display on which the presentation screen or slide is rendered so that the image overlays the presentation screen or slide.

* * * * *